April 14, 1959     M. W. MARIEN     2,882,108
PISTON ASSEMBLY

Filed May 28, 1957     2 Sheets-Sheet 1

Inventor
Melvin W. Marien
by Hill, Sherman, Meroni, Gross & Simpson Attys

April 14, 1959  M. W. MARIEN  2,882,108
PISTON ASSEMBLY

Filed May 28, 1957  2 Sheets-Sheet 2

Inventor
Melvin W. Marien
by Hill, Sherman, Meroni, Gross & Simpson  Attys

United States Patent Office 2,882,108
Patented Apr. 14, 1959

2,882,108

PISTON ASSEMBLY

Melvin W. Marien, Brentwood, Mo., assignor to Ramsey Corporation, St. Louis, Mo., a corporation of Ohio Application May 28, 1957, Serial No. 662,045

2 Claims. (Cl. 309—22)

The present invention relates generally to a piston asseembly, and more specifically to an improved piston incorporated therein.

Although the principles of the present invention may be included in various pistons, a particularly useful application is made in pistons of the type normally utilized in internal combustion engines. While such a usage has been shown and described herein, it is to be understood that such usage is by way of illustration, and not by way of limitation, the principles being applicable anywhere that good lubricant sealing is desired between a piston and cylinder.

In the past, oil control rings have been carried in a piston groove, which groove has been provided with a drain at its bottom for returning any lubricant which enters the groove. It has been noted that a surge or relatively large quantity of lubricant or fluid causes a pressure to build up on the lubrication side of an oil sealing ring, which pressure may act to displace the sealing ring, thereby allowing fluid to pass past such oil sealing rings. Such flow constitutes oil consumption in an engine and oil leakage in certain other piston-cylinder type of structures.

The present invention contemplates the provision of a reservoir, or recess, for the accumulation of fluid whereby a relatively large volume of such fluid may be stored at the surface of the piston, without an opportunity for an unseating pressure to build up against the ring. Further, drainage means are provided for the reservoir or recess whereby the fluid may be returned. Thus the recess has the ability to store a relatively large quantity of fluid in a very short time, thereby enabling the drain to return such fluid at a more gradual rate.

Accordingly, it is an object of the present invention to provide a low-cost, efficient piston and ring arrangement which is effective in sealing against blow-by, compression loss, and fluid loss.

Another object of the present invention is to provide adequate lubrication for the gliding surfaces of the rings and cylinder walls and to prevent excessive oil consumption.

Yet another object of the present invention is to provide a piston and ring arrangement not susceptible to sticking.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

Figure 1:
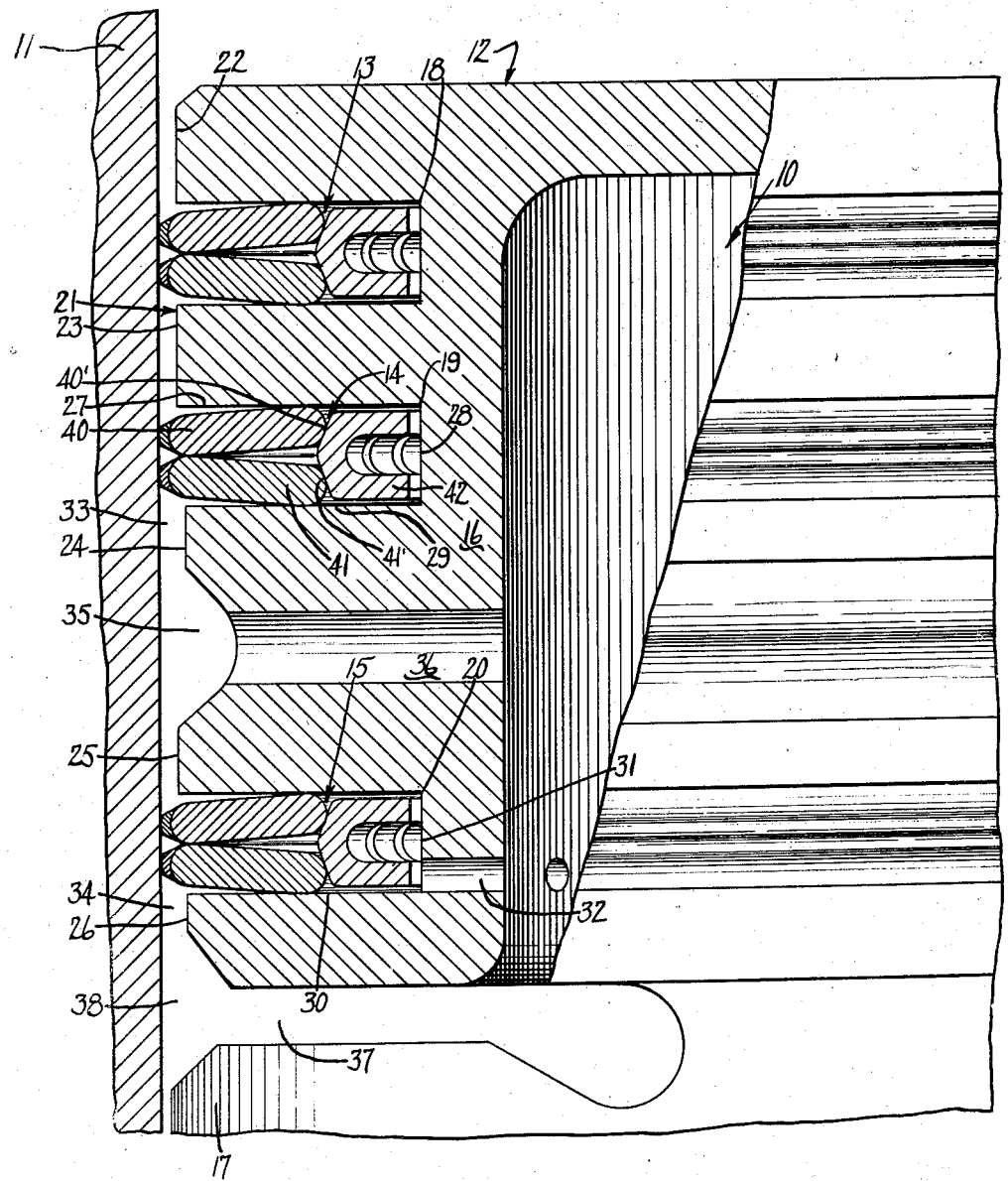
Figure 1 is an enlarged fragmentary elevational view, partly in section, of a piston assembly equipped with a piston provided in accordance with the principles of the present invention.

The principles of this invention are particularly useful when embodied in a piston assembly such as illustrated in Figure 1 generally indicated by the numeral 10. The assembly 10 is reciprocably carried within a cylinder 11 in any conventional manner. The piston assembly 10 includes a piston 12, a compression ring or compression ring assembly 13, a compression and oil scraper ring assembly 14, and an oil scraper ring assembly 15. The piston 12 includes a head 16 and a skirt 17. Within the head 16, the piston 12 has a compression ring groove 18, a compression and oil scraper ring groove 19, and a compression ring groove 20. The grooves 18–20 extend circumferentially around the piston 12 and open toward an outer wall, generally indicated by the numeral 21 of the piston 12. The outer wall 21 has a plurality of lands 22–26, each of which extends circumferentially about the piston 12. The lands 22–26 define the grooves 18–20. The groove 19 has a pressure side 27, a bottom 28, and a lubrication side 29. The groove 20 similarly has a lubrication side 30, and a bottom 31. If desired, a plurality of fluid drain-holes 32 may be provided so as to communicate the bottom 31 of the groove 20 with the interior of piston 12. The lands 24 and 26 are each provided with a smaller or reduced diameter whereby a pair of increased radial clearances 33, 34 between the lands 24 and 26 respectively and the wall of the cylinder 11 are provided. Thus the clearances 33, 34 comprise annular spaces or reservoirs immediately adjacent to the lubrication sides 29 and 30 of the oil ring grooves 19 and 20. It has been found that it is desirable that the diameter of the lands 24 and 26 be at least .030 inch less than that of the largest of the lands 22, 23, and 25. Thus if one of lands 22, 23, 25 were in engagement with the wall of the cylinder 11, a space of at least .015 inch is thereby provided annularly about the lands 24 and 26. In this drawing, lands 24 and 26 are reduced in diameter with respect to lands 22, 23 and 25. An equivalent result is obtained, if one or two of lands 22, 23 and 25 are radially extended with respect to lands 24 and 26. Adjacent to the lower ends of the recess 33, an annular recess 35 is provided, which recess is intermediate the lands 24 and 25. Means are provided for communicating the recess 35 with the interior of the piston 12, such means here including one or more drain-holes or passages 36. Similarly, one or more drain-holes or slots 37 provides a passage means for draining fluid from an annular recess 38 which communicates with the lower end of the annular space 34.

Figure 3:
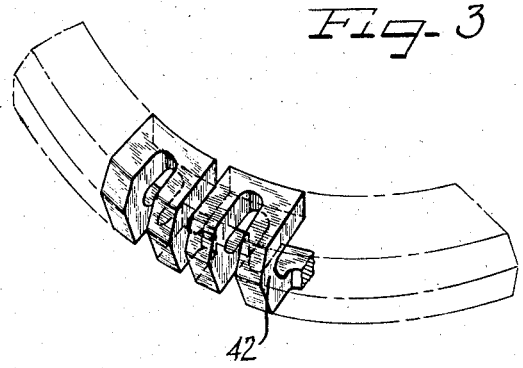
Figure 3 is an enlarged fragmental isometric illustration of an expander ring used in the embodiments of Figures 1 and 2.

Each of the ring assemblies 13, 14 and 15 are identical and are disclosed in greater detail and claimed in my copending application entitled "Circumferential Expander Type Piston Ring Asesmbly" filed May 28, 1957, Serial No. 662,090. The ring assembly 14 in the groove 19 includes a thin compression rail ring 40, a thin oil scraper rail ring 41, and an expander ring 42. The expander means 42 is positioned entirely behind the rails 40 and 41 and in spaced relation with the bottom 28 of the groove 19. The expander means 42, shown in greater detail in Figure 3, has a U-shaped radial cross-section, the bight of the U engaging the inner peripheries 40' and 41' of the rails 40 and 41 respectively. This engagement is at a slight angle as shown, whereby most of the expanding force from the expander means 42 urges the rails 40 and 41 outwardly, such force however, including a vector parallel to the axis of the piston 12 which urges the inner peripheries of the rails 40 and 41 axially to form a seal between rails 40, 41 and the sides 27 and 29 respectively.

On the downstroke of the piston 12, fluid on the interior of the cylinder wall 11 is scraped therefrom by the oil ring assembly 15 whereby an accumulation of fluid occurs in the recess 34 for subsequent outward flow through the recess 38 and the drain-hole 37 to the interior of the piston 12. Such fluid as gets past the ring assembly 15 is scraped from the interior of the cylinder wall 11 by the oil scraper ring 41 of the ring assembly 14. Such fluid accumulates in the recess 33 and flow therefrom through the recess 35 to the opening 36 and into the interior of the piston 12. The quantity of fluid frequently encountered in this type of operation on the interior wall of the cylinder 11 tends to build up a surge pressure on the lowermost rail ring, such as rail 41. Such pressure would tend to unseat the ring 41, both from the interior of the wall 11 and from the lower side 29 of the groove 19. However, this invention thus contemplates the provision of a larger than normal recess immediately below and adjacent to the ring 41. Since a relatively larger volume is thus available for receiving and storing the same quantity of fluid, the fluid force on the lower surface or lubrication side of the rail 41 is somewhat decreased. Further, the generally radial outward force of the expander ring 42 is divided into a radial vector which produces a seal between the rail 41 and interior wall of the cylinder 11, and an axial vector which acts on the inner peripheries of the rails 40 and 41 to provide seals between the rails and the sides 27 and 29 of the groove 19.

Figure 2:
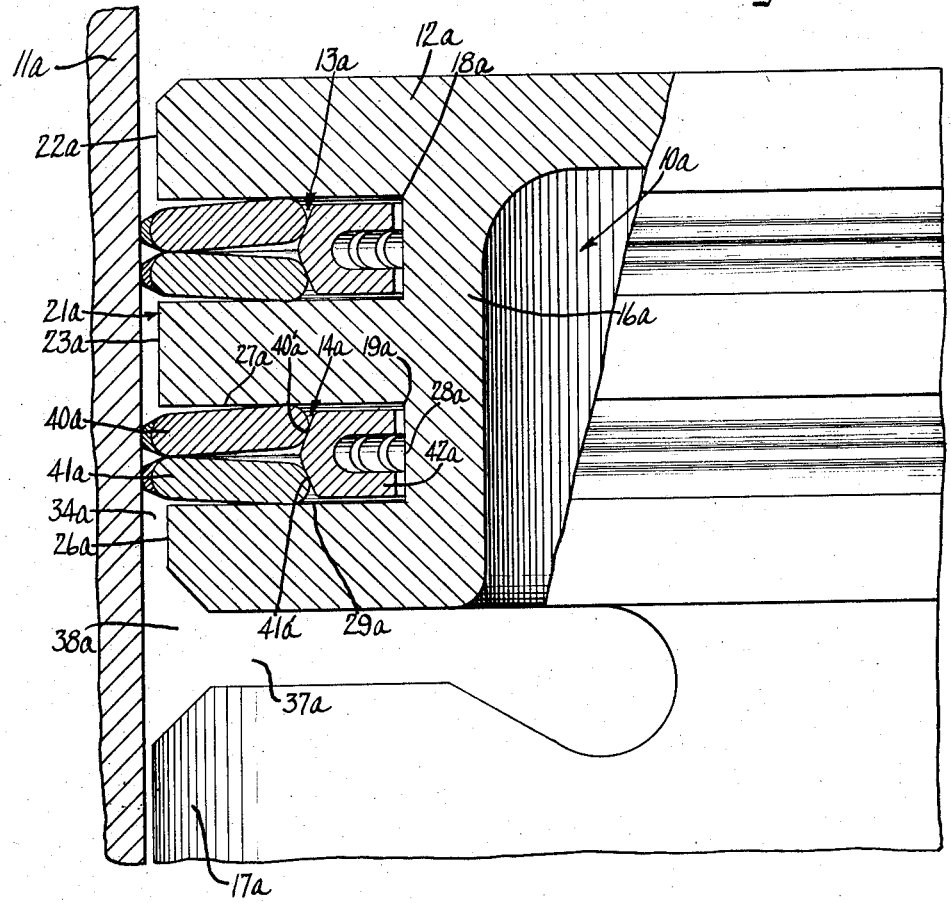
Figure 2 is a similar view of a slightly different embodiment in accordance with the principles of the present invention.

Referring to Figure 2, a slightly different embodiment is shown, and wherein the components have been given the same numerals as shown in Figure 1, but with the suffix letter "a" added. Thus the structure includes a piston assembly generally indicated by the numeral 10a which is reciprocably received within a cylinder 11a. The piston assembly 10a includes a piston 12a having a head 16a and a skirt 17a. The head 16a has an outer face generally indicated at 21a in which is received a pair of circumferential ring grooves 18a and 19a, which are defined by a plurality of lands 22a, 23a, and 26a. The assembly 10a further includes a compression ring or ring assembly 13a and a compression and oil scraper ring assembly 14a. Each groove, for example the groove 19, has an upper or pressure side 27a, a lower or fluid side 29a, and a bottom 28a. Within the groove 19a, there is received a compression ring 40a, a thin oil scraper ring 41a engageable therewith, and an expander ring 42a, which has a U-shaped radial cross-section and is identical to the expander used in Figure 1. The expander ring 42a and the ring assembly 14a are described in further detail and claimed in my copending application identified above. The expander ring 42a is positioned entirely behind the rails 40a and 41a and in spaced relation from the bottom 28a of the groove 19a. The bight of the U-shaped section of the expander ring 42a bears angularly against the inner peripheries 40a' and 41a' of the rails 40a and 41a respectively. In the form shown, the diameter of the land 26a is less than the diameter of lands 22a and 23a. It is to be understood, however, that it is necessary for only one of lands 22a and 23a to have a diameter which exceeds that of the land 26a. Thus an annular space 34a is defined by the land 26a jointly with the rail ring 41a and the interior wall of the cylinder 11a. A second annular space 38a communicates with the recess 34a and with a slot 37a, which leads to the interior of the piston 12a. On the downstroke of the piston assembly 10a, fluid on the interior wall of the cylinder 11a is scraped from the wall by the rail 41a and accumulates in the recess 34a which has a sufficient volume so as to preclude pressure surges and as to store the fluid temporarily while the slots 37a drain the fluid away. The upper end of the recess 34a is sealed by the rail 41a acting under the radial and axial vector forces applied thereto by the expander ring 42a.

Accordingly, this invention provides a low-cost, efficient piston and piston ring assembly which is particularly effective as a seal to prevent high oil consumption or leakage without limiting the lubrication of the cylinder wall. Furthermore, since the elements of the ring assemblies are relatively free to move and to take new positions within the narrow ring grooves, the ring assembly is not susceptible to sticking. Further, momentary pressure surges are accommodated in such a manner that the surges do not cause excessive oil consumption.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A piston assembly, for reciprocable use within a cylinder, said piston assembly including in combination, a piston; a plurality of spaced circumferential lands on said piston and defining a plurality of less than four ring grooves; a compression ring received in one of said grooves; a ring assembly received in another of said grooves; one of said lands defining the lubrication side of said other of said grooves; said one land being radially recessed from at least one of the other of said plurality of lands; said ring assembly comprising a compression rail and an oil scraper rail engageable with each other, and an expander means lying entirely behind said rails in spaced relation to the bottom of said other groove, said expander means having a U-shaped radial cross-section with the bight end of the U engaging the inner peripheries of said rails to bias them against the cylinder and the sides of said other groove; whereby an annular space is provided adjacent to said one land for accumulating lubricant on the downstroke, said space being positively sealed at one end by said ring assembly; and means for draining lubricant from the other end of said space.

2. A piston and ring assembly comprising in combination: a piston having a compression ring groove adjacent the head thereof and at least one oil ring groove axially below the compression ring groove, each of said oil ring grooves being defined by a pair of circumferential lands which determine the effective axial width of the grooves and the radial spacing of the open ends of the grooves from a cylinder in which the piston operates, the land on the compression groove side of each oil ring groove being of larger diameter than the land on the opposite side of said oil ring groove to provide unequal radial spacings between the piston and cylinder on opposite sides of each oil ring groove, top and bottom rail rings in each oil ring groove, a separator-expander in each oil ring groove urging said rails axially against the sides of the groove and against each other and accommodating unseating of the bottom rail from the bottom wall of the oil ring groove in response to a surge pressure on the oil scraping stroke of the piston, and the greater spacing from the cylinder of said land adjacent the bottom rail ring providing an enlarged recess for storing and bleeding oil to minimize the said unseating of the bottom rail from the bottom wall of the oil ring groove.

References Cited in the file of this patent
UNITED STATES PATENTS

| | | |
|---|---|---|
| 1,468,621 | Alford | Sept. 25, 1923 |
| 2,178,993 | Hill | Nov. 7, 1939 |
| 2,244,166 | Marien | June 3, 1941 |
| 2,608,452 | Hollingsworth | Aug. 26, 1952 |
| 2,645,536 | Prasse | July 14, 1953 |
| 2,695,825 | Estey | Nov. 30, 1954 |